United States Patent [19]

Aoshima et al.

[11] Patent Number: 4,815,063
[45] Date of Patent: Mar. 21, 1989

[54] DISC MOTOR CONTROL CIRCUIT FOR CONTROLLING THE ROTATION OF A DISC IN A DISC PLAYING DEVICE

[75] Inventors: Shinzi Aoshima; Sadayuki Narusawa, both of Hamamatsu, Japan

[73] Assignee: Yamaha Corporation, Hamamatsu, Japan

[21] Appl. No.: 905,883

[22] Filed: Sep. 10, 1986

[30] Foreign Application Priority Data

Sep. 13, 1985 [JP] Japan ................... 60-202828
Oct. 2, 1985 [JP] Japan ................... 219523
Oct. 7, 1985 [JP] Japan ................... 60-221783

[51] Int. Cl.$^4$ ............................ G11B 15/52
[52] U.S. Cl. ........................ 369/50; 358/321; 358/338; 360/73.03; 318/314
[58] Field of Search ........... 358/335, 342, 321, 338, 358/906; 360/73; 369/47, 50; 318/314, 341, 618, 85, 86

[56] References Cited

U.S. PATENT DOCUMENTS 4,259,698 3/1981 Takada ................ 318/314 X
4,603,411 7/1986 Sugiyama et al. ...... 358/342 X
4,695,778 9/1987 Chito et al. .......... 358/314

Primary Examiner—Robert L. Richardson
Attorney, Agent, or Firm—Spensley Horn Jubas & Lubitz

[57] ABSTRACT

In one aspect of the invention, a disc motor control circuit in a disc playback device comprises a rotation detection circuit for detecting the rotation speed of a disc motor and producing a rotation detection signal, a first control circuit for controlling the rotation speed of the disc motor by comparing the rotation detection signal with a reference clock, a second control circuit for controlling the rotation speed of the disc motor by comparing a synchronizing signal taken out of a reproduced signal from the disc with a reference clock, a window circuit for establishing a window for an expected timing of a next synchronizing signal on the basis of the synchronizing signal taken out of the reproducing signal, a state detection circuit for detecting a state of rotation of the disc motor by counting the number of the synchronizing signal entering the window and a mode switching circuit for selectively operating one of these control circuits in accordance with the result of counting in the state detection circuit.

13 Claims, 11 Drawing Sheets

| MODE MD | COUNTER 72 | WINDOW WS | WINDOW WD | T B C |
|---|---|---|---|---|
| 0 (AFC) | 1 (N1) | WS1 (±30%) | WD1 (±30%) | OFF |
| 1 (PLL1) | 1 (N1) | WS1 (±30%) | WD1 (±30%) | OFF |
| | 2 (N2) | WS2 (±15%) | | |
| 2 (PLL2) | 2 (N2) | WS3 $\left(\begin{smallmatrix}+4.8\%\\-1.5\%\end{smallmatrix}\right)$ | WD2 $\left(\begin{smallmatrix}+4.8\%\\-1.5\%\end{smallmatrix}\right)$ | ON |

FIG. 3

| SWITCHING OF LIMIT VALUES | | |
|---|---|---|
| LIMIT VALUES BEFORE SWITCH | CONDITIONS | LIMIT VALUES AFTER SWITCH |
| N1 (COUNTER 72=1) | REACH N=N1 FROM N<N1 | N2 (2) |
| N2 (2) | REACH N=N1 FROM N>N1 | N1 (1) |

FIG. 4

| SWITCHING OF MODE MD | | |
|---|---|---|
| MODE MD BEFORE SWITCH | CONDITIONS | MODE MD AFTER SWITCH |
| 0 (AFC) | REACH N=N1 | 1 (PLL1) |
| 1 (PLL1) | REACH N=N2 | 2 (PLL2) |
| 2 (PLL2) | REACH N=N1 | 1 (PLL1) |
| 1 (PLL1) | REACH N=0 | 0 (AFC) |

FIG. 5

DISC MOTOR CONTROL CIRCUIT FOR CONTROLLING THE ROTATION OF A DISC IN A DISC PLAYING DEVICE

BACKGROUND OF THE INVENTION

1. Field of the Invention

This invention relates to a disc motor circuit in a disc playback device for playing back discs such as an optical type video disc and a Compact Disc in the Compact Disc Digital Audio System.

2. Description of the Related Art

The control of rotation of a disc motor in a disc playback device is generally made by switching between an AFC (auto frequency control) and a PLL (phase locked loop).

The AFC is a rough control according to which rotation of a disc motor is controlled by comparing, in frequency, a pulse generated from a frequency generator, i.e., a device generating a pulse with a period corresponding to the rotation speed of the disc motor, with a reference clock. The AFC can be performed even when no synchronizing signal is obtained from a signal reproduced from a disc.

The PLL is a control of a relatively high precision according to which rotation of a disc motor is controlled by comparing, in phase, a synchronizing signal taken out of a signal reproduced from a disc (e.g., a horizontal synchronizing signal) with a reference clock.

When a synchronising signal cannot be taken out of a signal reproduced from a disc because the disc rotation speed is largely deviated from a specific speed, e.g., at the time of starting the disc motor, the AFC is carried out and, when the disc rotation speed has entered a range in which the synchronizing signal can be taken out of the reproduced signal from the disc, the control is switched to the PLL.

The PLL can be implemented within a certain range of the rotation speed above and below a target rotation speed and, accordingly, switching to the PLL does not necessarily bring about a stable rotation of the disc motor at the target speed immediately.

Besides, even after a stable rotation at the target speed has been attained by the PLL, the PLL sometimes is unlocked for some reason such as a shock applied to the disc from outside and a scratch on the disc and the disc rotation thereby becomes unstable. If, accordingly, controls which should be carried out in a stable rotation state of the disc such as a jitter removal control and a control for switching a window for detecting a horizontal synchronizing signal are carried out on the assumption that the stable rotation state has been brought about merely because the control mode has been switched to the PLL, accurate implementation of these controls cannot be expected.

SUMMARY OF THE INVENTION

It is, therefore, an object of the present invention to provide a disc motor control device capable of detecting a stable state of disc rotation in the PLL control mode thereby to enable accurate implementation of various controls.

This object is achieved by the disc motor control device according to the invention characterized in that it comprises a disc motor for rotating a disc for playback of the disc, pickup means for accessing the disc to produce a reproduced signal from the disc, a synchronizing signal takeout circuit for taking out a synchronizing signal from the reproduced signal from the disc, rotation detection means for detecting the rotation speed of the disc motor and producing a rotation detection signal, a first control circuit for controlling the rotation speed of the disc motor by comparing the rotation detection signal from said rotation detection means with a reference clock, a second control circuit for controlling the rotation speed of the disc motor by comparing the synchronizing signal taken out of the reproduced signal from the disc with a reference clock, a window circuit for establishing a window for an expected timing of a next synchronizing signal on the basis of the synchronizing signal taken out of the reproduced signal, state detection means for detecting a state of rotation of the disc motor by counting the number of the synchronizing signal entering the window, and mode switching means for selectively operating one of the first control circuit and the second control circuit in accordance with the result of counting in said state detection means.

According to an embodiment of the invention, the controls which should be performed in the stable rotation state are carried out after the stable rotation state is confirmed in the control by the second control circuit (PLL control) so that accuracy in these controls is ensured and, moreover, the disc rotation state is detected with the slightly widened window after the confirmation of the stable state in the PLL control so that undesirable too frequent stopping of the controls to be performed in the stable state can be prevented.

BRIEF DESCRIPTION OF THE DRAWINGS

A preferred embodiment of the invention will now be described with reference to FIGS. 1 through 7 in the accompanying drawings in which FIG. 3 is a diagram showing states of respective modes realized by a mode control circuit 70 in FIG. 1, FIG. 4 is a diagram showing switching conditions of an LMT counter 72 shown in FIG. 1, FIG. 5 is a diagram showing switching conditions of a mode MD in FIG. 1.

DETAILED DESCRIPTION

Figure 1:
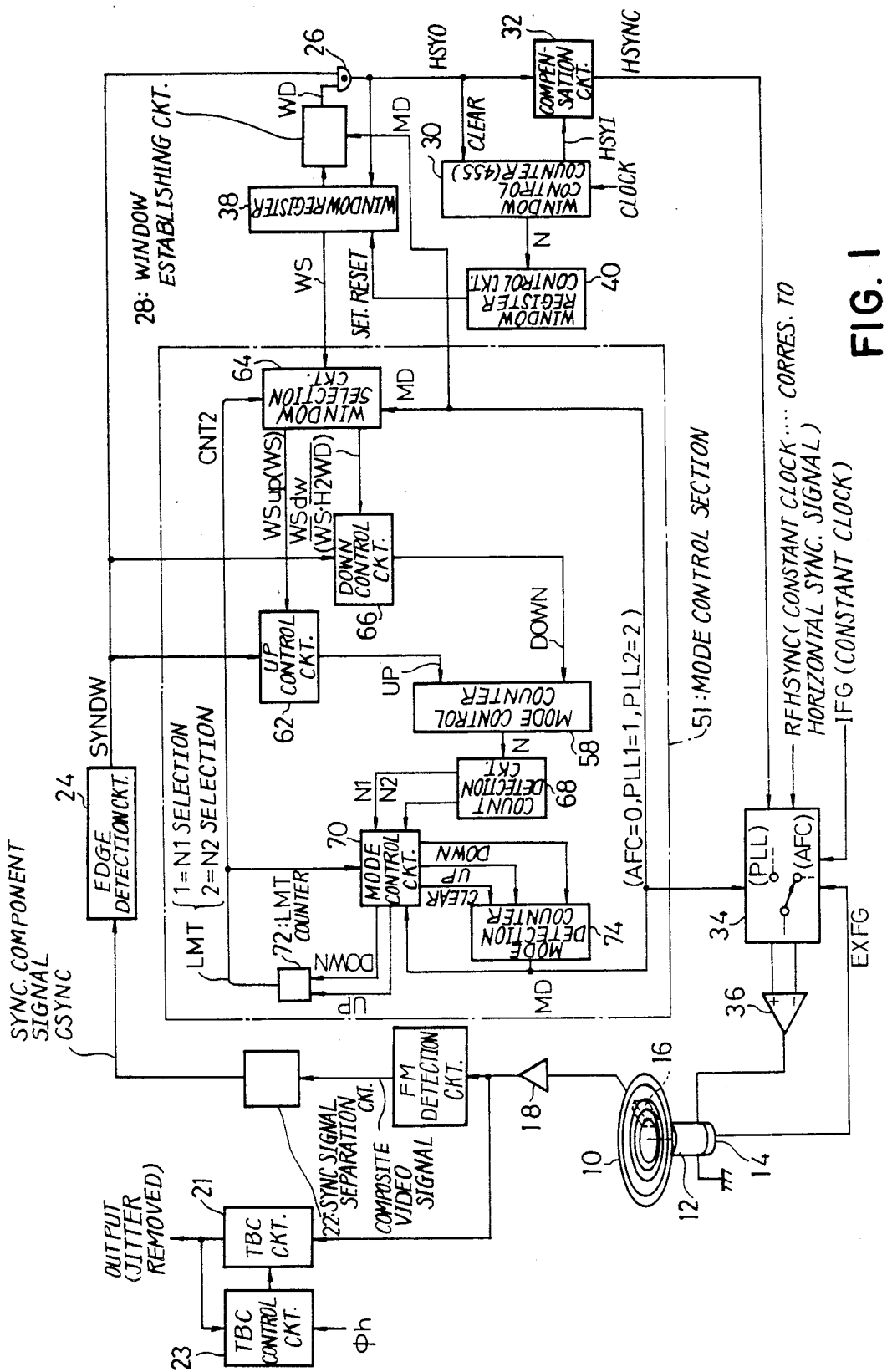
FIG. 1 is a block diagram showing the embodiment of the invention.

FIG. 1 shows an embodiment of the invention. Description will be made about a case in which the invention is applied to a playback device for a video disc.

In FIG. 1, a video disc 10 is rotated by a disc motor 12. A frequency generator 14 which is coupled to the disc motor 12 produces a pulse with a period proportionate to the rotation speed of the disc motor 12.

Data recorded on the disc 10 which has been detected by a pickup head 16 consists of a pulse frequency-modulated signal. This signal is applied to an FM detection circuit 20 for FM detection through an HF amplifier 18 and a composite video signal is provided from the FM detection circuit 20.

The output of the HF amplifier 18 is also applied to a TBC (time base correct) circuit 21. The TBC circuit 21 is provided for removing a jitter (sway on the time axis) contained in the reproduced signal from the disc and consists of a continuously variable delay circuit (e.g., the delay circuit utilizing CMOS inverters disclosed in corresponding U.S. patent application Ser. No. 760,332). A TBC control circuit 23 continuously variably controls the delay time of the TBC circuit 21. By comparing, in phase, a horizontal synchronizing signal existing in the output of the TBC circuit 21 with a clock $\phi h$ generated with a period of a regular horizontal synchronizing signal produced in response to crystal oscillator outputs and controlling the delay time of the TBC circuit 21 in accordance with the phase difference, a signal which has been removed of jitter is produced by the TBC circuit 21.

The composite video signal provided from the FM detection circuit 20 is supplied to a synchronizing component separation circuit 22 in which a synchronizing component signal CSYNC is separated.

An edge detection circuit 24 detects a fall portion of the synchronizing component signal CSYNC excluding a fall portion which is apparently deemed to be one of noise and thereupon produces an assumed synchronizing signal (i.e., a signal which is expected to be a true synchronizing signal) SYNDW. The removal of noise in this stage is performed by detecting only a fall portion which has a succeeding low level portion of a sufficient pulse width as required for the synchronizing signal and has a preceding pulse portion which maintains a risen state for a predetermined period of time.

The assumed synchronizing signal SYNDW obtained in this manner contains not only a horizontal synchronizing signal but also an equalizing pulse which is interposed between timings of the horizontal synchronizing signals during vertical retrace cancelling periods for discriminating a vertical synchronizing signal. There is also a possibility that an unexpected noise remains in the assumed synchronizing signal. For removing such equalizing pulse and unexpected noise, a window establishing circuit 28 is provided. This window establishing circuit 28 establishes a window WD at a timing at which a horizontal synchronizing signal HSYO is expected to occur and takes out, from an AND gate 26, the assumed synchronizing signal SYNDW occurring in the window WD as a true horizontal synchronizing signal HSYO. By this arrangement, equalizing pulses and noise which occur outside of the window are removed.

The width of the window WD is changed over among various widths as will be described later depending upon the state of stableness of the disc rotation.

A window control counter 30 measures timing within one horizontal scanning period H (i.e., a normal interval of generation of the horizontal synchronizing period HSYO). The window control counter 30 counting up a crystal oscillator output counts 455 counts in one horizontal scanning period H during the normal rotation speed and is cleared by the horizontal synchronizing signal HSYO.

A compensation circuit 32 produces, when the horizontal synchronizing signal HSYO has not been obtained in the window WD due to dropout or the like cause, a substitution signal HSYI at the 454-th count of the window control counter 30. When the subsitution signal HSYI is utilized, the window control counter 30 is cleared by this substitution signal HSYI.

Since the window WD has some ranges before and after the 454-th count of the window control counter 30, whether the horizontal synchronizing signal HSYO occurs in the window WD or not is not known at the timing of the 454-th count (the signal HSYO may occur in the window range after the 454-th count). In the compensation circuit 32, therefore, the horizontal synchronizing signal HSYO and the substitution signal HSYI are delayed for a predetermined time and, upon ending of the window WD, either the horizontal synchronizing signal HSYO (when the horizontal synchronizing signal has occurred in the window) or the substitution signal HSYI (when the horizontal synchronizing signal has not occurred in the window) is provided from the compensation circuit 32.

A switching circuit 34 switches the disc rotation control mode between PLL based upon phase comparison of the horizontal synchronizing singal HSYO with a reference clock RFHSYNC and AFC based upon frequency comparison of an output pulse EXFG of the frequency generator 14 with a reference clock IFG. A comparator 36 carries out this phase comparison or frequency comparison for controlling the rotation of the disc motor 12.

A window register control circuit 40 produces signals designating timings of starting and ending of windows in response to counts of the window control counter 30. In this embodiment, the control circuit 40 produces signals designating timings of the above described window WD for detecting the horizontal synchronizing signal HSYO and, in addition to it, timings of an intermediate window H2WD and windows WS for detecting states of stableness of the disc rotation.

Figure 2:
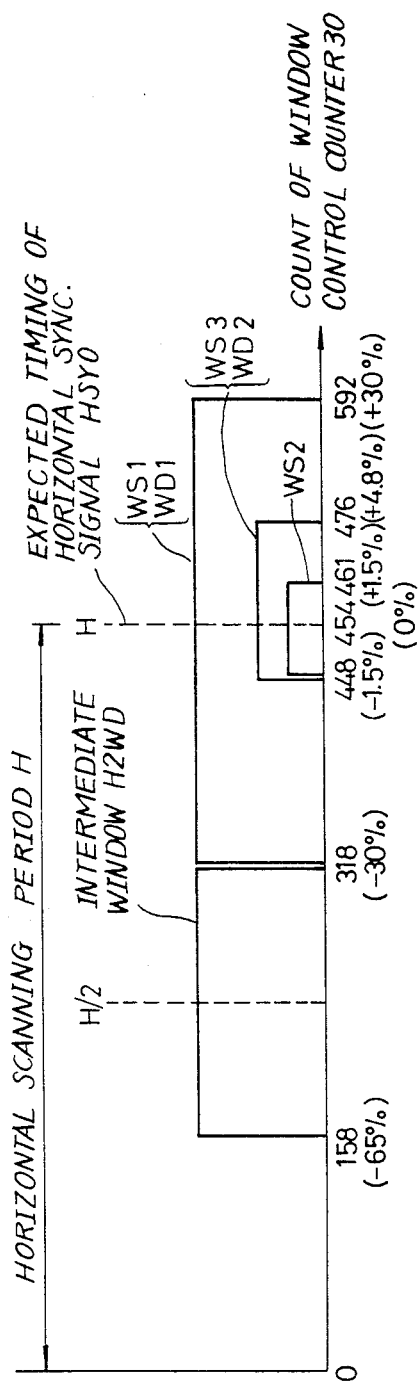
FIG. 2 is a diagram showing positions of windows employed in the embodiment of FIG. 1.

An example of the respective windows is shown in FIG. 2. The window WD for detecting the horizontal synchronzing signal HSYO consists of a wide window WD1 and a narrow window WD2. The wide window WD1 is established for a period of time from count 318 to count 592 of the window control counter 30 ($\pm 30\%$ from the timing at which the horizontal synchronizing signal HSYO is expected to occur, the period of 1H being taken as 100%). The narrow window WD2 is established for a period of time from count 448 to 476 ($-1.5\%$ to $+4.8\%$ The intermediate window H2WD is established for a period of time from count 158 to count 318 ($-65\%$ to $-30\%$ ).

The windows WS for detecting the stableness of the disc rotation consist of WS1, WS3 and WS2, in the order of a wider window range. The window WS1 is established for a period of time from count 318 to count 592 ($\pm 30\%$ from the expected timing of the horizontal synchronizing signal HSYO). The window WS3 is established for a period of time from count 448 to count 476 ($-1.5\%$ to $+4.8\%$ ). The window WS2 is established for a period of time from count 448 to count 461 ($\pm 1.5\%$ ).

A window register 38 comprises registers for the respective windows which are set and reset at corresponding timings by signals from the window register control circuit 40 thereby producing signals indicating the window range of the respective windows.

A mode control section 51 detects the state of stableness of the disc rotation and switches the control mode. In this embodiment, there are three control modes of AFC mode, PLL1 mode and PLL2 mode. The AFC mode is used in the most unstable state and the disc rotation control is effected by AFC during this mode. The PLL1 mode is used in a state which is more stable than the AFC mode but has not reached a final stable state yet and the disc rotation control is effected by PLL during this mode. The PLL2 mode is used in the final stable state and the disc rotation control is effected by PLL also during this mode. It is not until this PLL2 mode that controls such as the jitter removal control and the window switching control by the window establishing circuit 28 are carried out. An arrangement is made so that, while strict conditions are imposed in switching the mode to a higer mode, i.e., from the AFC mode to the PLL1 mode or from the PLL1 mode to the PLL2 mode, the mode is not switched readily to a lower mode once it has entered a higher mode thereby preventing too frequent switching of the control mode.

The detection of the stable state of the disc rotation is made by employing the disc rotation state detection windows WS and detecting the assumed synchronizing signal SYNDW has occurred at a timing at which the horizontal synchronizing signal HSYO is expected to occur. If the number of times the assumed synchronizing signal SYNDW occurs in the window WS is large, the disc rotation is assumed to be in a stable state and otherwise it is assumed to be in an unstable state. When the disc motor 12 is driven by AFC, occurrence of the assumed synchronizing signal SYNDW is watched in the wide window WS1 (with the ranges of +30% from the expected timing of the horizontal synchronizing signal HSYO) and, when the number of times this signal SYNDW occurs in the window WS1 has exceeded a predetermined number, the control mode is switched to the PLL1 mode. In the PLL1 mode, occurrence of the assumed synchronizing signal SYNDW is watched in the narrow window WS2 (with the ranges of ±1.5%) and, when the number of times the signal SYNDW occurs in the window WS2 has exceeded a predetermined number, the control mode is switched to the PLL2 mode on the assumption that the most stable state has been reached.

Since it has now been confirmed by entering of the PLL2 mode that the disc rotation has reached the most stable state, the controls including the jitter removal control by the TBC circuit 21 and the window switching control (i.e., switching from the wide window WD1 to the narrow window WD2) for detecting the horizontal synchronizing signal HSYO are carried out. By this switching of the window WD, noise in the assumed synchronizing signal SYNDW is substantially removed and a normal horizontal synchronizing signal HSYO only is picked up.

Even after the control mode has been switched to the PLL2 mode, the disc rotation sometimes becomes unstable due to some reason. To cope with this situation, occurrence of the horizontal synchronizing signals HSYO is watched in the window WS3 and, when the number of times the signal HSYO has not occurred in this window WS3 has increased above a predetermined number, the control mode is switched to the PLL1 mode. For preventing too frequent switching of the control mode in such cases, the window range of the window WS3 is set to be one from −1.5% to +4.8% which is wider than the range of the window WS2 (±1.5%) used in the PLL1 mode.

The structure of the mode control section 51 will now be described. A window selection circuit 64 selects the window WS for detecting stableness of the disc rotation. More specifically, the window selection circuit 64 selects one of the windows WS1, WS2 and WS3 (FIG. 2) in response to a mode signal MD and a signal LMT from an LMT counter 72 to be described later.

An up control circuit 62 passes one of the assumed synchronizing signals SYNDW which occurs in the window WS which includes the timing of the horizontal synchronizing signal HSYO at a normal speed (this window will sometimes be referred to as window WSUP). A down control circuit 66 passes one of the assumed synchronizing signals SYNDW which occurs outside of the window WS and also outside of the intermediate window H2WD (these windows will hereinafter be referred to as window WSDW). In this case, the assumed synchronizing signal SYNDW occurring in the intermediate window H2WD is excluded for preventing occurrence of a down signal due to an equalizing pulse during the normal rotation of the disc.

Frequency of occurrence of the assumed synchronizing signal SYNDW in the window WSUP increases during a stable rotation whereas frequency of occurrence of the signal SYNDW in the window WSDW increases during an unstable rotation.

When no signal occurs in any of the windows WSUP and WSDW during 1H, the down control circuit 66 judges that this state is an unstable rotation and produces one shot of pulse at each 1H determined by an internal reference counter.

A mode control counter 58 counts up an output pulse from the up control circuit 62 and counts down an output pulse from the down control circuit 66. If, accordingly, in the present mode, the rotation becomes stable and frequency of occurrence of the assume synchronizing signal SYNDW in the window WSUP increases, the count N of the mode control counter 58 increases whereas if the rotation is still unstable and frequency of occurrence of the signal SYNDW in the window WSDW is large, the count N of the mode control counter 58 decreases.

The mode control counter 58 counts up and down from 0 to N2 through N1 (N1 and N2 are marginal counts to be described later which are set at, e.g., N1=2048 and N2=3072). When the mode control counter 58 has counted down to 0, the count N does not go below 0 even when a down pulse is further applied to the counter 58. When the counter 58 has been counted up to N2, the count N does not go above N2 even when an up pulse is further applied to the counter 58.

The mode control counter 58 is used for switching the control mode. When it counts up, the disc rotation is deemed to be becoming stable and, upon confirmation of reaching of the count N to a predetermined marginal value, the control mode is switched to a higher one. Conversely, when it counts down, the disc rotation is deemed to be still unstable and, upon confirmation of reaching of the count N to a predetermined marginal value, the control mode is switched to a lower one.

A count detection circuit 68 detects reaching of the count of the mode control counter 58 to the marginal value N1 or N2 which is conditions for switching the control mode.

A mode detection counter 74 designates the control mode. In the mode detection counter 74, the count itself represents the control mode. The mode detection counter 74 counts up and down in response to the mode control circuit 70 from 0 to 2 and designates the AFC mode at count 0, the PLL1 mode at count 1 and the PLL2 mode at count 2. The mode signal MD is applied to the switching circuit 34 to switch this circuit 34 to the AFC side when the count is 0 and to the PLL side when the count is 1 or 2.

An LMT counter 72 is a counter indicating which of the marginal values N1 and N2 is to be selected as a target value of the mode control counter 58. When the count N of the mode control counter 58 is smaller than N1, the count of the LMT counter 72 is 1 (i.e., N1 selection) and when the count N is larger than N1, the count of the LMT counter 72 is 2 (N2 selection).

A mode control circuit 70 performs switching of the mode by counting up and down of the mode detection counter 74 and the LMT counter 72 in accordance with the present mode MD, the count of the LMT counter 72 and the count of the mode control counter 58.

States of the respective modes are shown in FIG. 3.

When the mode is the AFC mode (MD 32 0) and the LMT counter 72 is 1 (N1 selection), the disc rotation detection window WS is ±30%, the window WD for picking up HSYO is controlled at ±30% and the TBC circuit 21 is in an OFF state. This is the initial state.

When the mode is the PLL1 mode (MD=1) and the LMT counter 72 is 1 (N1 selection), the disc rotation detection window WS is ±30%, the window WD for picking up HSYO is controlled at ±30% ant the TBC circuit 21 is in an OFF state.

When the mode is the PLL1 mode (MD=1) and the LMT counter 72 is 2 (N2 selection), the disc rotation detection window WS is ±1.5%, the window for picking up HSYO is controlled at ±30% and the TBC circuit 21 is in an OFF state.

When the mode is the PLL2 mode (MD=2) and the LMT counter 72 is 2 (N2 selection), the disc rotation detection window WS is −1.5% to +4.8%, the window WD for picking up HSYO is controlled at −1.5% to +4.8% and the TBC circuit 21 is in an ON state. This is the final stable state.

In a case where a combination of the control mode and the state of the LMT counter 72 which is not described in FIG. 3 has occurred due to an erroneous operation of the circuit (e.g., a combination of the AFC mode and the count 2 of the LMT counter 72 or a combination of the PLL2 mode and the count 1 of the LMT counter 72), the mode control circuit 70 clears the mode detection counter 74 and sets the count of the LMT counter 72 to 1 and thereby restores the mode to the AFC mode which is the initial state.

Conditions of switching of the marginal values N1 and N2 are shown in FIG. 4. The LMT counter 72 which selects the marginal values is switched according to its state before being switched and the value N of the mode control counter 58. When the marginal value before switching is N1 (i.e., the LMT counter 72 is 1), the marginal value is switched to N2 (i.e., the LMT counter 72 is 2) by reaching of the count N to N1. When the marginal value before switching is N2 (i.e., the LMT counter 72 is 2), the marginal value is switched to N1 (i.e., the LMT counter 72 is 1) by reaching of the count N to N1 (i.e., the LMT counter 72 is 1).

Nextly, conditions of switching of the control mode are shown in FIG. 5. The control mode is switched according to the control mode before it is switched and the count of the mode control counter 58. When the control mode before switching is the AFC mode, the control mode is switched to the PLL1 mode by reaching of the count N to the marginal value N1. Once the control mode has been switched to the PLL1 mode, this PLL1 mode is maintained even if the count N has been reduced below N1 unless conditions for the PLL2 mode have been satisfied.

When the control mode before switching is the PLL1 mode, the control mode is switched to the PLL2 mode by reaching of the count N to the marginal value N2. When the control mode before switching is the PLL2 mode, the control mode is switched to the PLL1 mode by reaching of the count N to the marginal value N1. When the control mode before switching is the PLL1 mode, the control mode is switched to the AFC mode by reaching of the count N to 0.

Figure 6:
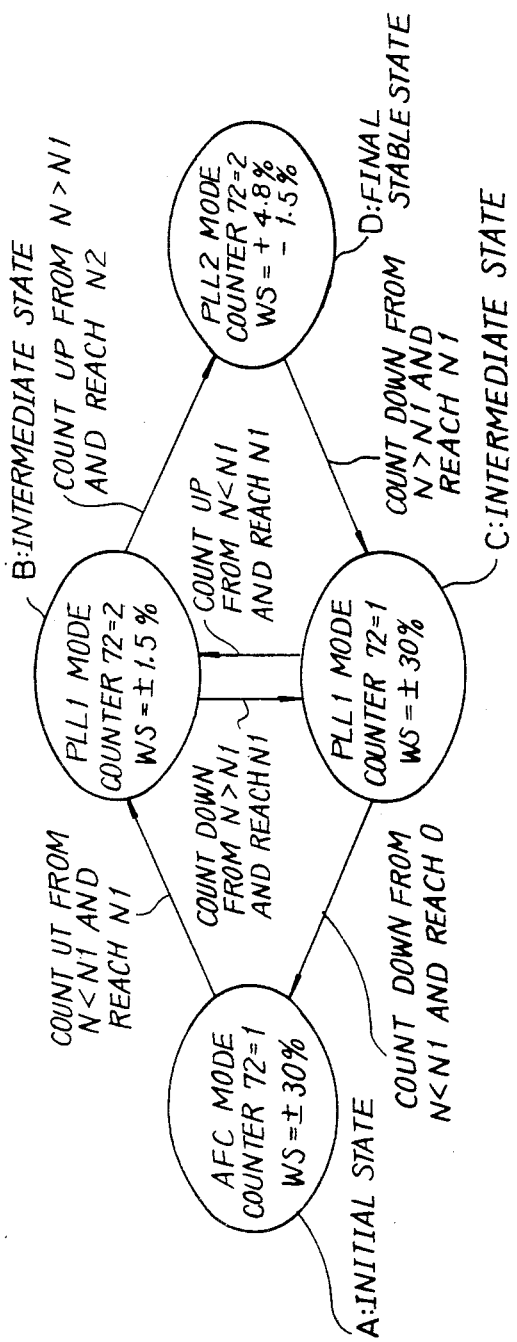
FIG. 6 is a diagram showing change of the mode in FIGS. 4 and 5 and FIG. 7 is a diagram showing an example of mode change according to FIG. 6.

FIG. 6 shows generally states of change of the control mode by the above described conditions of switching. The illustrated states are results of an operation when a normal playback command has been given. In this operation, the control mode is changed from the initial state A on the left side of the figure towards the final stable state D on the right side in a predetermined order without skipping an intermediate step.

The initial state A is the AFC mode in which the rotation state is detected by using the wide window WS ±30%. Upon reaching of the count N1 in the initial state A, the control mode is changed to the PLL1 mode of an intermediate state B in which the narrow window WS of ±1.5% is used. The count N is temporarily reduced below N1 by switching of the disc rotation control from AFC to PLL and in this case, an intermediate state C is brought about in which, though the control mode is the same PLL1, the rotation state is detected by using the window WS which is widened to ±30%. If the rotation state is directed to a stable state again in the intermediate state C and the count N1 has been reached, the intermediate state B is restored in which the narrow window of ±1.5% is used for detecting the rotation state. If the rotation state is directed to a stable state and the count N2 has been reached, the control is switched to the PLL2 mode of the final stable state D. In the PLL2 mode, the wider window WS than in the intermediate state B, i.e., −1.5 to +4.8%, is used to prevent too frequent switching of the control mode to the lower mode. Upon reaching of this final stable state D, the window WD for picking up the signal HSYO is switched from one of ±30% to one of −1.5 to +4.8% whereby noise is more certainly removed. The jitter removal operation by the TBC circuit 21 is now started and a stable playback thereby is realized.

Even in a stable rotation state in the PLL2 mode, there sometimes occurs an off-focus state due to a shock applied to the disc or a scratch on the disc and the rotation thereby becomes unstable. Upon decreasing of the count N to N1 in this state, the control mode is switched to the PLL1 mode of the intermediate state C in which restoring to the stable rotation is attempted. If the attempt for restoring to the stable rotation in the intermediate state C has been successful, the control mode is changed through the intermediate state B to the final stable state D. If the attempt for restoring to the stable rotation in the intermediate state C has failed, the control mode is lowered to the AFC mode of the initial state A in which further attempt is made for restoring the stable rotation so that the control mode is changed from the intermediate B through the intermediate state C to the intermediate state B) to the final stable state D.

Figure 7:
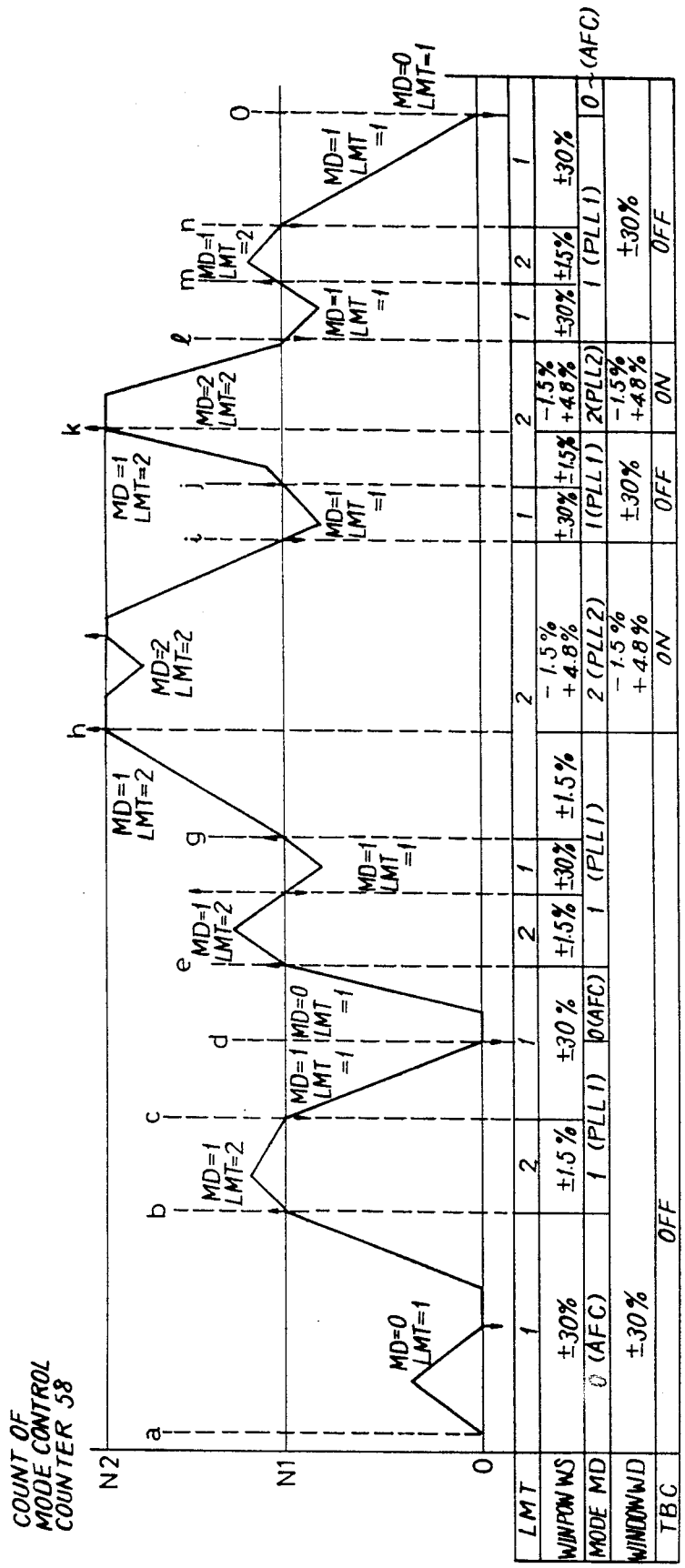

FIG. 7 shows states of actual mode change. Upon starting of the operation at a, the rotation is controlled in the AFC mode until the count N has reached N1. Upon reaching of the count to N1 at b, the control mode is switched to the PLL1 mode (intermediate state B). If the count N is decreased to N1 at c, the control mode is switched to the PLL1 mode (intermediate state C). If the count is further decreased to 0 at d, the control mode is returned to the AFC mode. The count N is not decreased below 0.

If an attempt is made to restore the stable rotation in the AFC mode and the count has reached N1 at e, the control mode is switched to the PLL1 mode (intermediate state B). In switching the rotation control from AFC to PLL, rotation temporarily becomes unstable and the count is decreased to N1 at f and the control mode is switched to the PLL1 mode (intermediate state C). An attempt is made again in this state to restore the stable rotation and, upon reaching of the count N to N1 again at g, the PLL1 mode (intermediate state B) is restored. If the count N further increases to N2 at h, the control mode is switched to the PLL2 mode. The count N does not increase above N2.

If the disc rotation becomes unstable for some reason and the count N is decreased to N1 at i, the control mode is lowered to the PLL1 mode (intermediate state C) and an attempt is made to restore the stable rotation. If the attempt has been successful and the count N has reached N1 at j, the control mode is switched to the PLL1 mode (intermediate state B). If the count N is increased further to N2 at k the control mode is switched to the PL2 mode.

If the rotation becomes unstable again and the count N is decreased to N1 at l, the control mode is lowered to the PLL1 mode (intermediate state C) in which an attemp is made to restore the stable rotation. If the count N is increased to N1 at m, the PLL1 mode (intermediate mode B) is brought about. If the unstable rotation continues and the count N is decreased to N1 at n, the control mode is lowered to the PLL1 mode (intermediate state C). If the count N is further decreased to 0 at o, the control mode is switched to the AFC mode and an attempt is made to restore the stable rotation in the initial state again. In the foregoing manner, the switching of the control mode is incessantly made for bringing about the final stable rotation which is the target of the control.

For recording data on a video disc, there are two recording systems of a constant angular velocity system (hereinafter referred to as CAV) and a constant linear velocity system (hereinafter referred to as CLV). The revolution number of CAV is constant, i.e., 1800 rpm for all circumferences of the disc whereas that of CLV continuously varies between 1800 rpm in the innermost circumference and 600 rpm in the outermost circumference. It is therefore desirable for a control circuit for a disc motor of this type of disc to be adaptable to both of the recording systems without causing any problem.

In the above described AFC/PLL switching control system, if a target revolution number is set at about 1800 rpm, the revolution number at the starting of the disc motor is about 1800 rpm in both a CAV disc and a CLV disc. By starting the disc motor in AFC, therefore, a reproduced clock can be obtained from a signal reproduced from the disc in both types of discs and the control mode thereafter is switched to PLL without causing any substantial problem. Thereafter, a preset rotation control state can be maintained in both the CAV disc and the CLV disc by PLL so long as a reproduced clock is derived accurately from the reproduced signal.

This control system is not sufficient, however, for coping with all unexpected events which could take place. No serious problem will occur in the case of the CAV disc in which the revolution number is constant. In the case of the CLV disc in which the revolution number varies, if an off-focus state has occurred due to a shock applied from the outside of the system, a scratch on the disc or the like cause with a result that no reproduced clock is obtained from the reproduced signal from the disc, maintenance of PLL responsive to the reproduced clock becomes impossible so that the disc motor control will have to be changed to AFC. If, in this case, the target revolution number of AFC is set at about 1800 rpm notwithstanding that an expected revolution number is 800 rpm, the disc rotation speed will be compelled to rise to the vicinity of 1800 rpm. In this state, a proper reproduced clock will never be obtained so that the disc motor control will not be able to return to PLL but the disc will merely rotate on without reproducing any signal.

For preventing such inconvenience, an arrangement has been made in the past so that the present disc playback position is stored in some form and, in the event such switching to AFC has taken place, the target revolution number of AFC is changed in accordance with the present disc playback position. For changing the target revolution number of AFC, however, a reference clock must also be changed. For changing the reference clock, a multi-stage frequency dividing circuit and a control circuit for selecting a clock of a required frequency must be additionally provided. This will apparently result in requirement of a complex circuitry and increase in the manufacturing cost. Another problem in this approach is how the disc playback position can be identified. If positional data is recorded on a disc, such data can be directly utilized. All disc presently available on the market have no such data recorded thereon. For coping with this problem, therefore, a detection device capable of detecting the pickup position accurately must be additionally provided. Such addition of the detection device will result in further increase in the manufacturing cost.

It is, therefore, another object of the invention to provide a disc motor control device in a disc playback device which is of a simple construction without requiring a complex rotation control mechanism, particularly in the control system of a lower accuracy such as AFC, and yet is capable of accurately performing switching to the control system of a higher accuracy such as PLL at the starting of the disc motor and also capable of restoring of the control system of the higher accuracy when the control has been switched to the control system of the lower accuracy during playback of a disc.

For achieving this object, the disc motor control circuit according to the invention is characterised in that it comprises a disc motor for rotating a disc for playback of the disc, pickup means for accessing the disc to produce a reproduced signal from the disc, a synchronizing signal takeout circuit for taking out a synchronizing signal from the reproduced signal from the disc, rotation detection means for detecting the rotation speed of the disc motor and producing a rotation detection signal, a first control circuit for controlling the rotation speed of the disc motor by comparing the rotation detection signal from the rotation detection means with a reference clock, a second control circuit for controlling the rotation speed of the disc motor by comparing the synchronizing signal taken out of the reproduced signal with a reference clock, limit setting means for setting upper and lower limit values of the disc rotation speed, comparison means for comparing the upper and lower limit values set by the limit setting means with the rotation detection signal from said rotation detection means for detecting a rotation state and mode switching means for selectively operating one of said first control circuit and said second control circuit in accordance with an output of said comparison means.

According to the invention, in a rough rotation control, acceleration and deceleration of the disc rotation speed are repeated between the upper and lower limit values in such a manner that the disc rotation speed is decreased upon reaching the upper limit value and increased upon reaching the lower limit value and, when a state in which an accurate rotation control can be attained has occurred, the rotation control is switched to this control. Accordingly, switching to an accurate rotation control can be realized and, moreover, even when a state in which an accurate rotation control can be attained has changed, switching to an accurate rotation control likewise can be realized.

Figure 8:
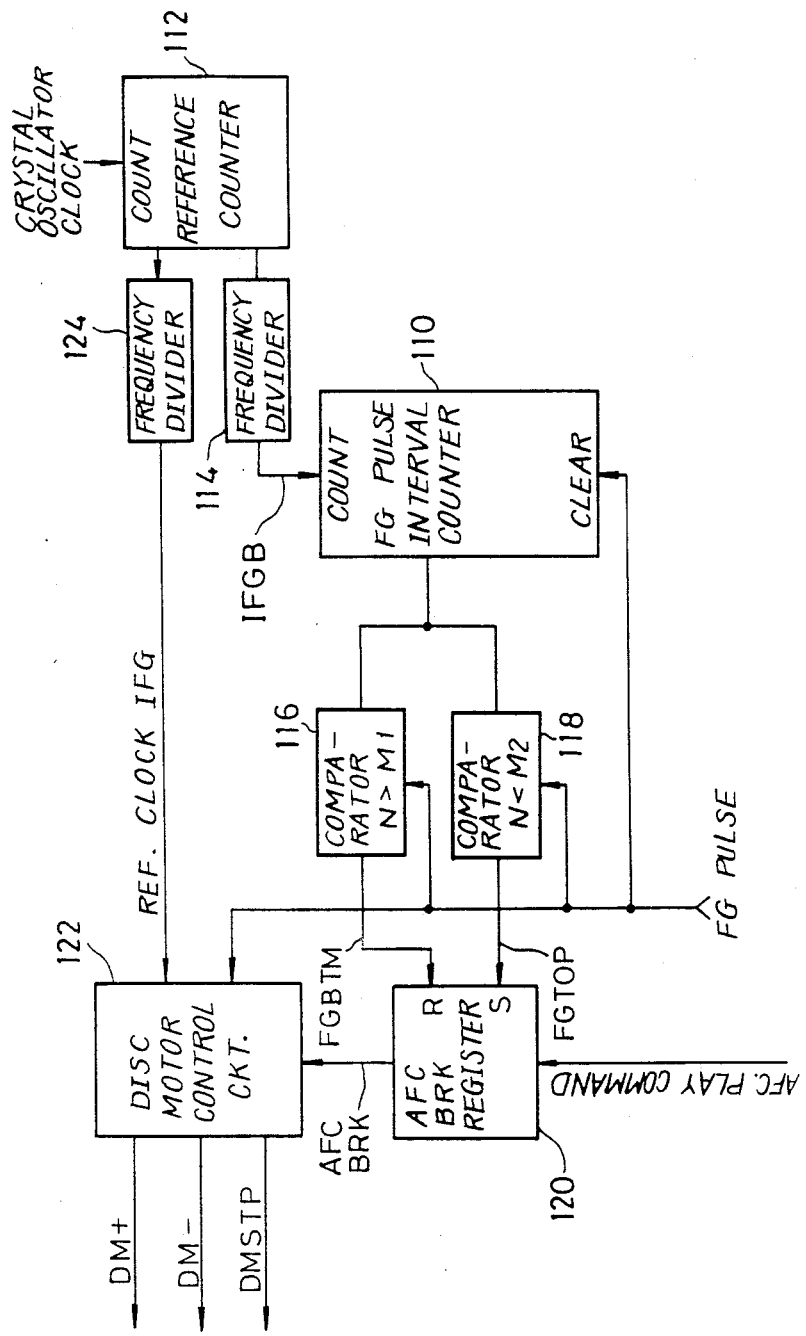
FIG. 8 depicts a circuit for effecting acceleration and deceleration of the disc motor with FIG. 9 being a specific example thereof.
Figure 9:
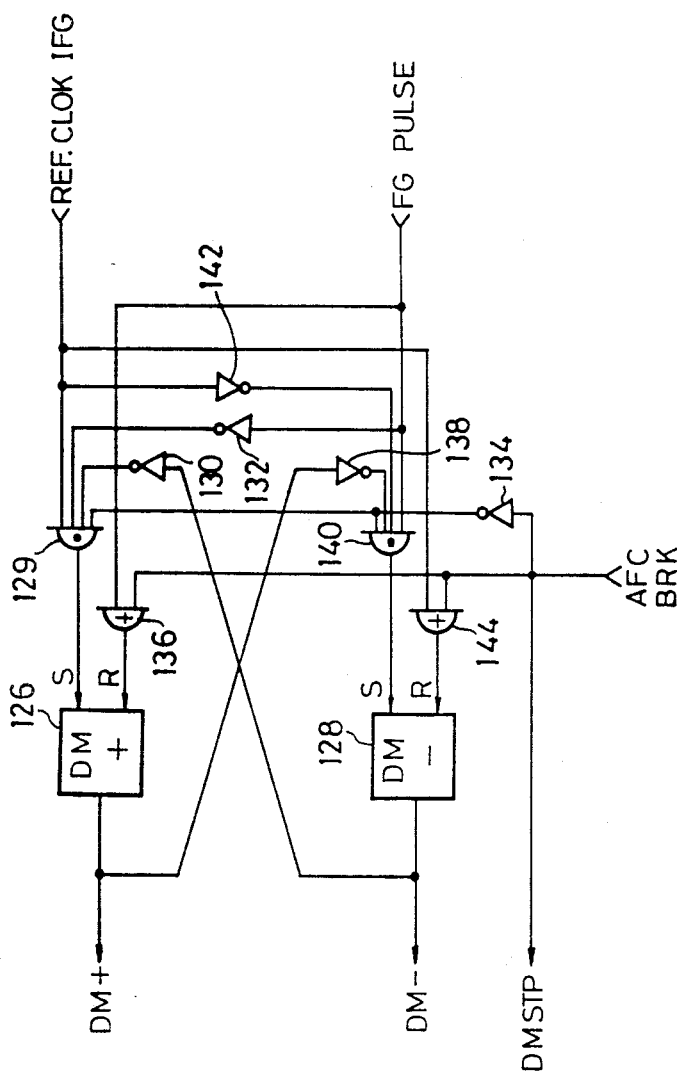
Figure 10:
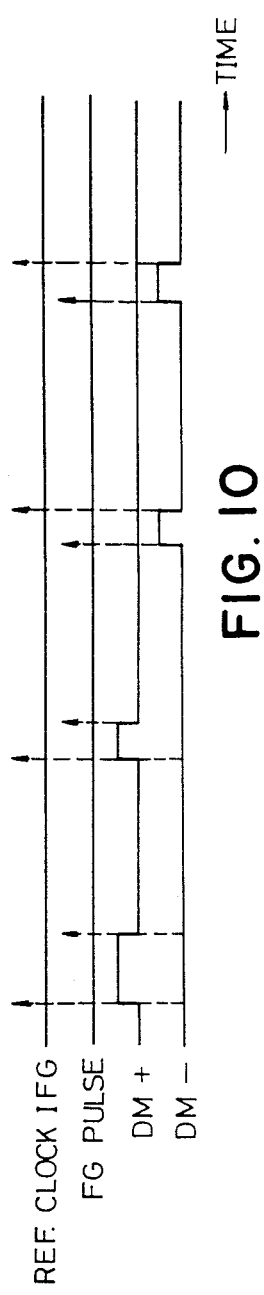
FIG. 10 depicts waveforms representing the AFC operation of the motor control circuit.
Figure 11:
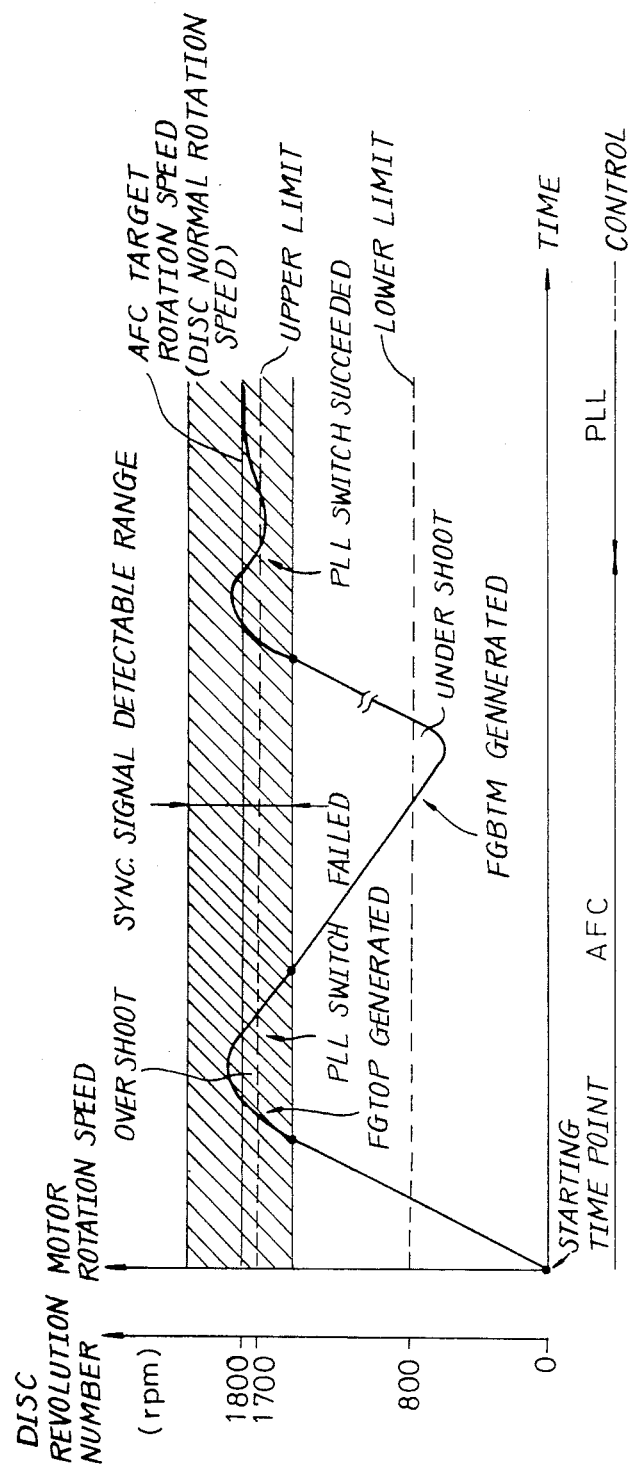
FIGS. 11 and 12 further depict various aspects of motor operation.
Figure 12:
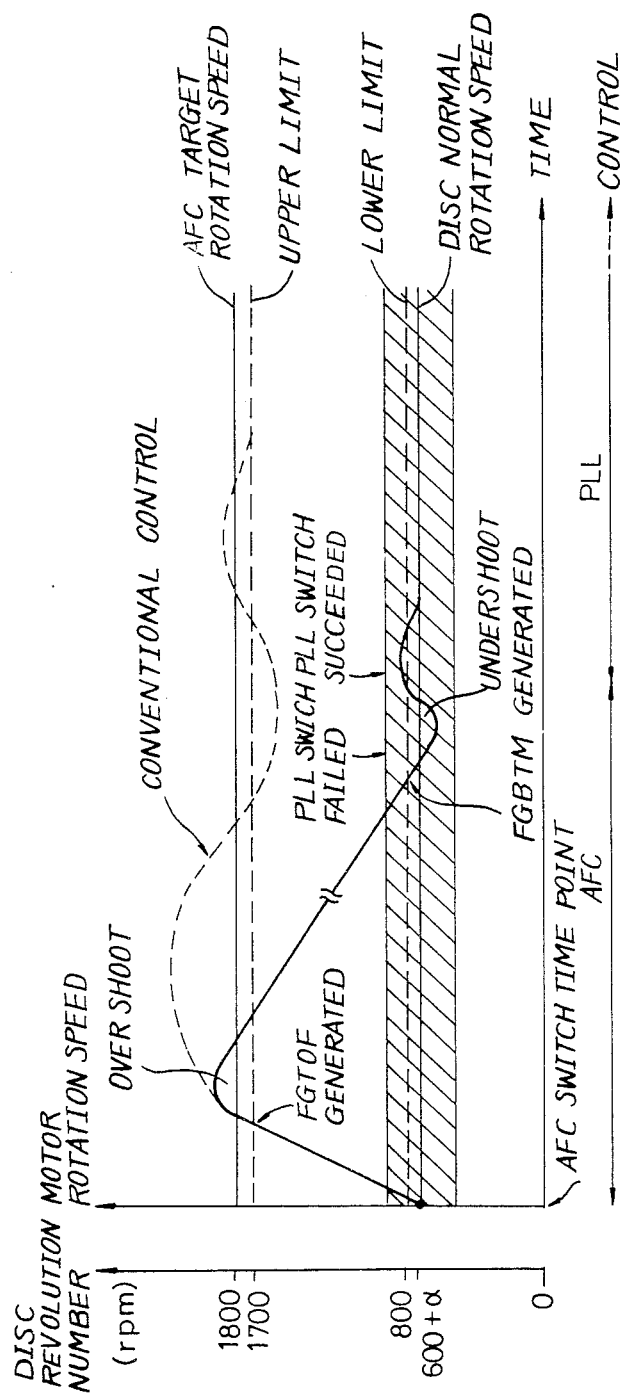

An embodiment realizing this aspect of the invention will now be described with reference to FIGS. 8 through 12 in which FIG. 8 is a block diagram showing the embodiment, FIG. 9 is a circuit diagram showing a specific example of a disc motor control 22 in FIG. 8, FIG. 10 is a time chart showing the AFC operation by the circuit shown in FIG. 9, FIG. 11 is a diagram for explaining the operation at the starting time, and FIG. 12 is a diagram for explaining the operation during playback of a CLV disc.

FIG. 8 shows an embodiment of a circuit for repeatedly performing acceleration and deceleration of the disc motor by AFC between the lower limit value and the upper limit value. A control circuit for the circuit for switching the rotation control of the higher accuracy are not illustrated.

In FIG. 8, an FG pulse interval counter 110 counts up a reference clock IFGB which is derived by frequency-dividing, by a frequency divider 114, an output of a reference counter 112 driven by a clock provided by a crystal oscillator, and is cleared by an FG pulse. The FG pulse counter 110 therefore has a count corresponding to the period of the FG pulse which is inversely proportional to the speed of the disc motor at an instant immediately before the FG counter 110 is cleared by the FG pulse, i.e., the count becomes a large value when the period of the FG pulse is long (i.e., the speed of the disc motor is slow) and it becomes small when the period of the FG pulse is short (i.e., the speed of the disc motor is fast).

A comparator 116 detects the fact that the speed of the disc motor has reached the lower limit value. The comparator 116 compares a count M1 set as the lower limit value with a count N of the FG pule interval counter 110 at a timing of the FG pulse and, when the count N is larger than the count M1, judges that the count has reached the lower limit value and produces a signal FGBTM.

A comparator 118 detects the fact that the speed of the disc motor has reached the upper limit value. The comparator 118 compares a count M2 set as the upper limit value with the count N of the FG pulse interval counter 110 at a timing of the FG pulse and, when the count N is smaller than the count M2 (M2<M1), it judges that the count has reached the upper limit value and produces a signal FGTOP.

The upper and lower limit values are determined on the basis of a target rotation speed corresponding to a normal revolution number of the disc whose rotation is to be finally controlled. In the present embodiment, the target rotation speed has some range for coping with a CLV disc whose revolution number varies. Taking into account an overshoot due to the time constant which the control system itself has, the upper limit value is determined at a value which is slightly below the maximum value of the target rotation speed. Similarly, taking into account an overshoot due to the time constant of the control system, the lower limit value is determined at a value which is slightly above the minimum value of the target rotation speed.

An AFCBRK register 120 produces a signal AFCBRK for switching off AFC. The register 120 is set at a timing of the FG pulse when it receives the upper limit value detection signal FGTOP in a state in which an AFC-PLAY command a command for driving in the AFC mode) is provided thereto, producing the AFC off signal AFCBRK which is "1" thereby switching off AFC. When the register 120 has received the lower limit value detection signal FGBTM, the register 120 is reset at the timing of the FG pulse thereby producing the AFC off signal AFCBRK which is "0" and switching on AFC.

A disc motor control circuit 122 produces a signal DM. for rotating the disc motor in a forward direction, a signal DM− for rotating the disc motor in a reverse direction and a signal DMSTP for switching off the disc rotation servo. When the AFC off signal AFCBRK applied to the circuit 122 is "1", the signal DMSTP becomes "1" and the signals DM+ and DM− both become "0" whereby AFC is switched off, i.e., driving of the disc motor is stopped. When the AFC off signal AFCBRK is "0", AFC is performed by the signals DM+ and DM− by comparing in phase the FG pulse with a reference clock IFG prepared by frequency-dividing the output of the reference counter 112 in a frequency divider 124. In other words, a value set by the reference clock IFG becomes the target AFC rotation speed.

A specific example of the disc motor control circuit 122 in FIG. 8 is shown in FIG. 9.

In FIG. 9, a DM+ register 126 produces the signal DM−. This register 126 is set at a timing of the reference clock IFG and reset at a timing of the FG pulse. However, when a DM− register 128 to be described later has been set before the register 126, an AND gate 129 is turned off through an inverter 130 so that the DM+ register 126 is not set. When the AFC off signal AFCBRK is produced, the AND gate 129 is turned off through an inverter 132 so that the DM. register 126 is not set. When the signal AFCBRK has been produced, the AND gate 129 is turned off through an inverter 134 and a reset input of the DM. register 126 becomes "1" through an OR gate 136 so that the DM+ register 126 is reset.

The DM− register 128 produces the signal DM−. This register 128 is set at a timing of the FG pulse and reset at a timing of the reference clock IFG. However, when the DM+ register 126 has been set before the register 128, an AND gate 140 is turned off through an inverter 138 so that the DM− register 128 is not set. When the reference clock IFG is produced, the AND gate 140 is turned off through an inverter 142 so that the DM− register 128 is not set. When the signal AFCBRK is produced, the AND gate 140 is turned off through an inverter 134 and a reset input of the DM− register 128 becomes "1" through an OR gate 144 so that the DM− register 128 is reset.

The AFC operation by the disc motor control circuit 122 of FIG. 9 is shown in FIG. 10.

In the disc motor control circuit 122, the disc motor rotation is controlled using the reference clock IFG and the FG pulse so that the motor rotation corresponds to the reference clock IFG. More specifically, when the reference clock IFG is produced before the FG pulse, the signal DM− is inhibited and the signal DM+ is generated with a pulse width corresponding to a phase difference between the reference clock IFG and the FG pulse. When the FG pulse is produced before the reference clock IFG, the signal DM+ is inhibited and the signal DM− is generated with a pulse width corresponding to a phase difference between the FG pulse and the reference clock IFG. A negative feedback is applied to the disc servo by these signals DM+ and DM− to control the disc motor rotation to a normal rotation.

A specific example of the operation of the disc motor at the starting time by the circuit of FIG. 8 is shown in FIG. 11.

The starting takes place from the innermost circumference of the disc and, accordingly, the normal revolution number is 1800 rpm in both CAV and CLV discs and the target rotation speed of the disc motor corresponds to this revolution number. The upper limit value of the rotation speed at which the signal FGTOP is generated is determined at a value corresponding to the revolution number of 1700 rpm which is slightly smaller than the normal revolution number of 1800 rpm. This arrangement is made because an overshoot is produced due to the time constant of the control system itself and the revolution number of 1800 rpm is sufficiently attained by this overshoot. The lower limit value at which the signal FGBTM is produced is determined at the revolution number of 800 rpm which is slightly larger than 600 rpm which is the minimum value of the normal revolution number of the CLV disc taking an undershoot due to the time constant of the control system into account. The reference clock IFG on the basis of which the target AFC rotation speed in the disc motor control circuit 122 is determined is fixed to a value which corresponds to the revolution number 1800 rpm.

Since the rotation speed is 0 at the starting time, the signal FGBTM is "1". If the AFC-PLAY command is given, the AFCBRK register 120 is reset. The signal AFCBRK s turned to "0" and the disc motor control circuit 122 turns the signal DMSTP to "0" and performs AFC using the signals DM+ and DM− by comparing the reference clock IFG with the FG pulse in phase. Consequently, the disc motor is accelerated towards the target rotation speed corresponding to the disc revolution number of 1800 rpm.

When the motor speed has reached a synchronizing signal detectable range shown as a shaded portion in FIG. 11, the rotation control is normally expected to be switched to the PLL control which is a control of a higher accuracy. If the motor speed should reach the upper limit value without being switched to PLL due to failure in picking up a synchronizing signal for some reason, the signal FGTOP is turned to "1" and the AFCBRK register 120 thereby is set. The signal AFCBRK therefore becomes "1" and this causes the disc motor control circuit 122 to produce the DM+ and DM− signals which are both "0" and the signal DMSTP which is "1" AFC thereby is switched off and the disc motor makes free rotation with a result that the motor rotation speed drops naturally. At this time, the change in the motor rotation speed is accompanied by an overshoot due to the time constant which the control system itself has and the rotation speed therefore is not reduced immediately but it starts to drop naturally after once reaching a high rotation speed beyond the target revolution number of 1800 rpm. Since the overshoot portion and the initial portion of this natural drop in the rotation speed are both within the synchronizing signal detectable range as shown in FIG. 11, the rotation control can be switched to PLL if a synchronizing signal is obtained in this range.

In a case where the rotation control is not switched to PLL in the foregoing process, if the motor rotation speed has reached the lower limit value due to the natural deceleration, the signal FGBTM is turned to "1" and the AFCBRK register 120 is reset. The disc motor is accelerated towards the target rotation speed by AFC again after an undershoot due to the time constant of the control system.

In the process of repeating the acceleration by AFC and the deceleration by the free rotation between the upper and lower limit values, a synchronizing signal can be obtained without fail unless there is some serious disorder in the playback device and the rotation control thereby is switched to PLL which is a control of a revolution number of the disc.

The control of AFC-off by the upper limit value is effective also for suitably restraining the overshoot due to the time constant of the AFC control system whereby time required for switching to PLL and stabilization of the rotation speed can be shortened.

Description will now be made about re-switching to PLL in a case where an off-focus state has occurred when the disc is being played back in a stable state in PLL for some reason such as an unexpected shock applied from outside of the device or a scratch on the disc and, accordingly, a synchronizing signal cannot be obtained from the disc any longer and the motor rotation control has therefore returned to AFC.

In the case of a CAV disc, the disc revolution number is constant (1800 rpm) regardless of the pickup position on the disc. The re-switching to PLL is entirely the same as the switching to PLL at the starting time described with reference to FIG. 10.

In the case of a CLV disc, the normal revolution number of the disc differs depending upon the pickup position on the disc. By way of example, an operation of the circuit of FIG. 8 in a case where a synchronizing signal has not been detected when the pickup is picking up data on the disc in the vicinity of the outermost circumference is shown in FIG. 12. At this time, the normal disc revolution number is 600+αrpm and a synchronizing signal is detectable in certain ranges above and below this revolution number as shown by a shaded portion in the figure. Upon switching to AFC due to missing of the synchronizing signal, the disc motor starts to accelerate towards the target AFC rotation speed (1800 rpm). If, in an initial stage of this acceleration, a state in which the synchronizing signal is detected is restored within the synchronizing signal detectable range, the rotation control is switched again to PLL at this time point and the process described below is not perfomed. If such state is not restored, the motor rotation speed increases and approaches the upper limit value. In this region of the rotation speed, there is no possibility of obtaining the synchronizing signal at all. Upon reaching of the upper limit value, an operation similar to the one described with reference to FIG. 11 is performed and the disc rotation speed is naturally decreased. Thus, the rotation speed enters the synchronizing signal detectable range again. If the abnormal state which caused the missing of the synchronizing signal has been eliminated by this time, the rotation control is switched to PLL. If, however, the synchronizing signal has not been obtained yet, the natural deceleration continues and the rotation speed finally reaches the lower limit value. The signal FGBTM thereupon is produced and AFC is switched on again. Owing to the undershoot as described above, the rotation speed once drops below 600 rpm but thereafter it turns to acceleration and rises through the synchronizing signal detectable range. An attempt for switching to PLL is made during rising of the rotation speed in this range. If switching to PLL has not been made this time either, the disc motor is accelerated towards the target AFC rotation speed again. This operation is repeated any number of times. By this repeated operation, reswitching to PLL can be ultimately attained unless there is any serious disorder in the device. When missing of the synchronizing signal has occurred not in the outermost circumferential portion but in the innermost circumferential portion, only difference is that the target rotation speed of the disc motor corresponding to the normal revolution number of the disc shown in FIG. 12 and the synchronizing signal detectable range of the predetermined width are vertically shifted. Moreover, the range of shifting is limited to one between the revolution number of 1800 rpm and 600 rpm and the rotation speed change of the disc motor can cover this range sufficiently by the control using the upper and lower limit values so that switching to PLL can certainly be attained by the operation described with reference to FIG. 12. Besides, this can be realized without using any special playback position detection device.

Let us consider, just for comparison's sake, what would happen if, in the case of FIG. 12, the rotation control by the above described upper and lower limit values was not made. In this case, the disc rotation speed would converge to the target AFC rotation speed (1800 rpm) after going through several overshoots and undershoots as shown by a dotted line in FIG. 12. In state, detection of the synchronizing signal would be impossible and the disc would continue to rotate endlessly without reproducing signals recorded thereon.

In stopping rotation of a disc in a disc playback device, it would take a long time before the disc stops completely if the stopping of the disc was effected merely by a control of switching off a disc motor (i.e., turning a drive voltage applied to the disc motor to 0) with a resulting inconvenience that changing of a disc cannot be made quickly. It is therefore commonly practiced, for realizing a prompt stopping of a disc, to apply a reverse oltage to the disc motor to apply a braking force thereto and switching off the disc motor upon detecting a zero speed.

In a case where such stopping control by applying a reverse voltage is made by detecting rotation of the disc motor by means of an inexpensive frequency generator, the direction of rotation cannot be detected and, accordingly, if the frequency generator should fail to detect the zero speed, the disc will be continuously rotated reversely without stopping.

It is, therefore, another object of the invention to provide a disc motor control circuit capable of accurately stopping a disc even if speed detection means which is incapable of detecting the direction of rotation such as a frequency generator is employed.

For achieving this object, the disc motor control circuit according to the invention is characterized in that it comprises a disc motor for rotating a disc for playback of the disc, pickup means for accessing the disc to produce a reproduced signal from the disc, drive means for driving the disc motor, rotation speed detection means for detecting the rotation speed of the disc motor comprising rotation speed zero detection means for detecting a state in which the rotation speed is substantially zero and acceleration detection means for detecting a state in which the rotation speed is increased, and brake means for performing a brake control to the disc motor in accordance with results of detection by the rotation speed zero detection means and the acceleration detection means.

According to the invention, the fact that the rotation speed has exceeded the zero speed due to application of the reverse voltage is detected by an accelerated state so that inversion of the direction of rotation can be substantially detected even if speed detection means incapable of detecting the direction of rotation such as a frequency generator is used. Besides, when the inversion of the direction of rotation has been detected, a voltage for inverting the driving direction is automatically applied to the disc motor so that acceleration does not continue but, by stopping application of voltage upon detection of a state in which the rotation speed is zero or substantially zero at some time point, the disc rotation can be accurately stopped.

Figure 13:
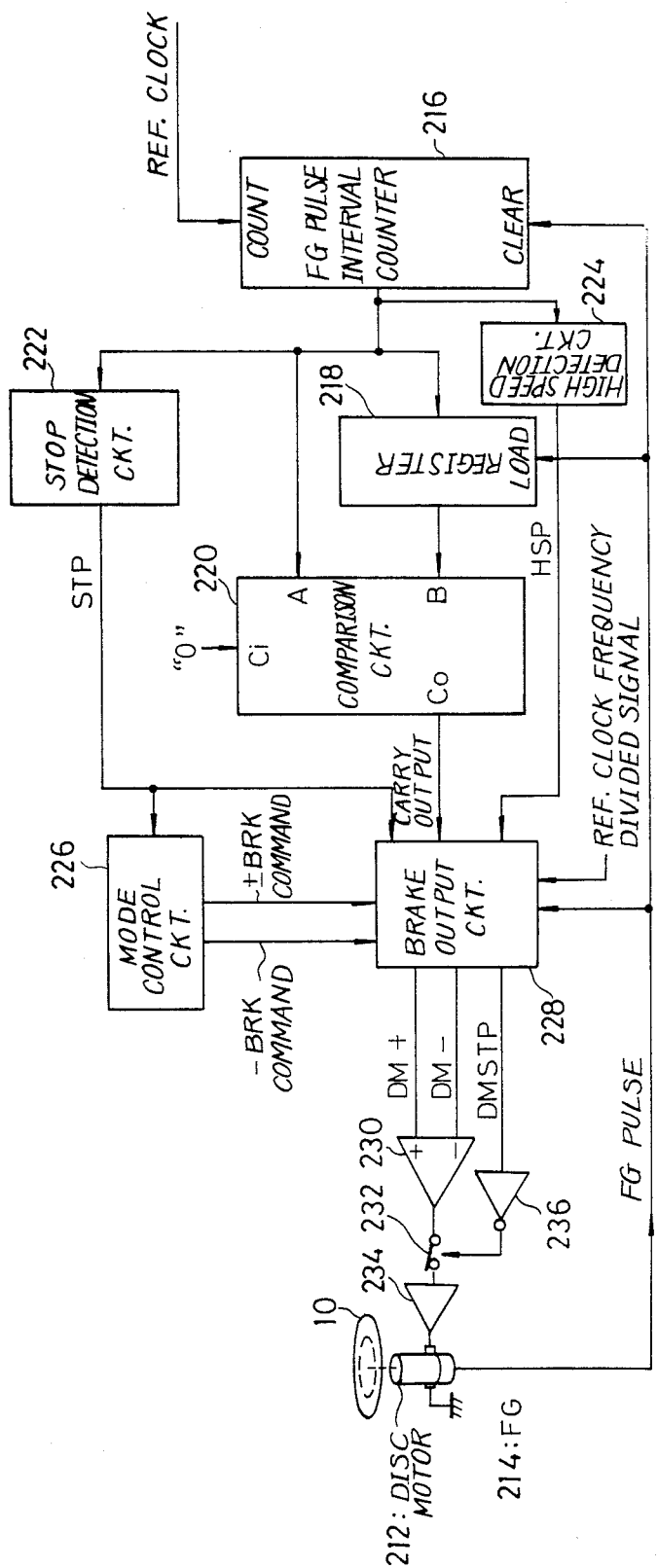
FIGS. 13 and 14 depict, respectively, a block diagram and a specific circuit diagram for causing braking operation of the disc drive motor.
Figure 14:
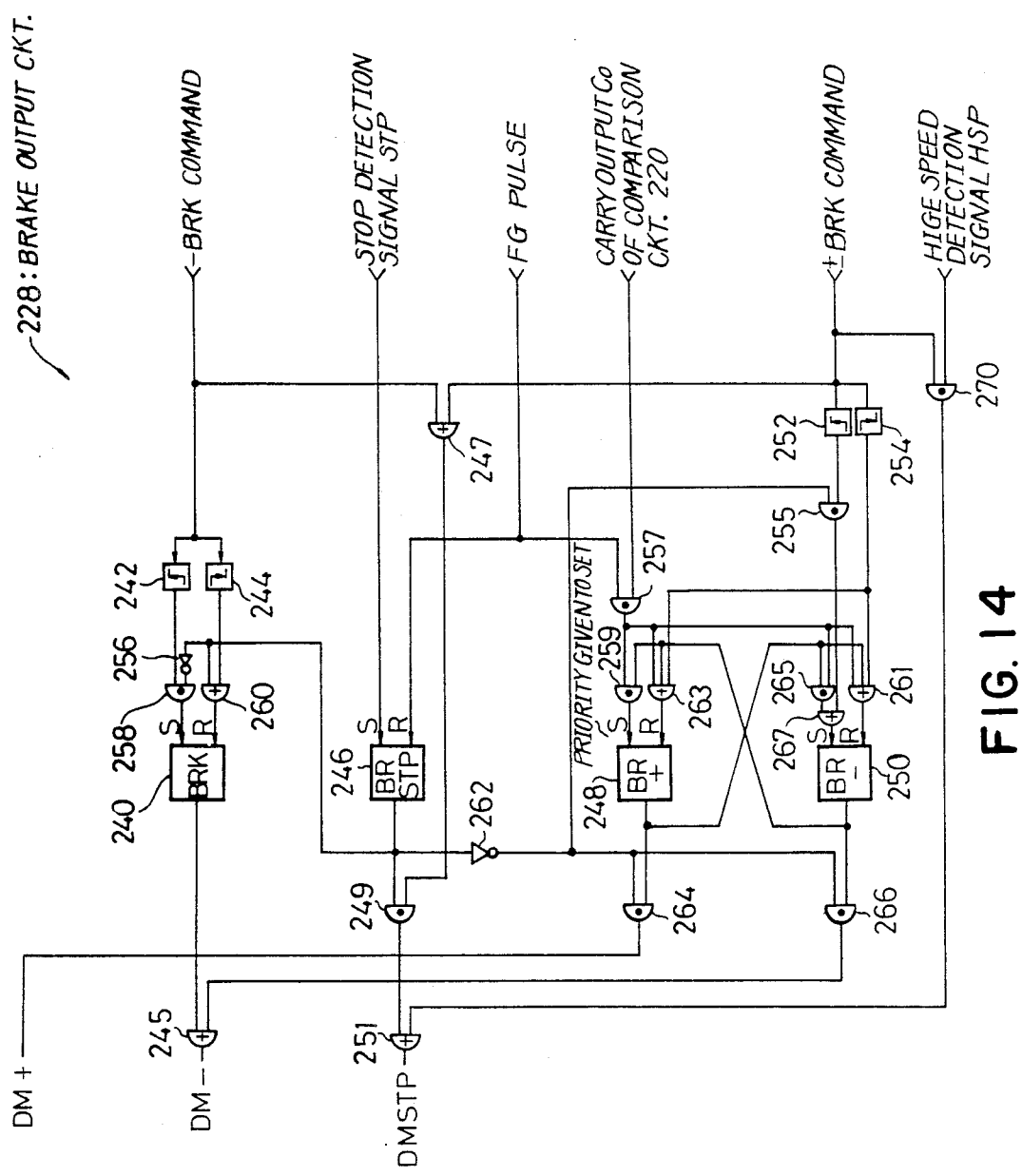

An embodiment realizing this aspect of the invention will now be described with reference to FIGS. and 14 in which FIG. 13 is a block diagram showing the embodiment and FIG. 14 is a circuit diagram showing a specific example of a brake output circuit 228 in FIG. 13.

Referring to FIG. 13, a DC motor is used for a disc motor 212 for rotating a disc 10. During playback of the disc 10, rotation speed control is made by applying a pulse width modulated positive voltage DM+ or DM− to the disc motor 212. The rotation of the disc motor 212 is detected by a frequency generator 214 coupled directly to the rotation shaft of the disc motor 212 and an FG pulse whose period is inversely proportional to the rotation speed of the disc motor 212 is produced by the frequency generator 214.

An FG pulse interval counter 216 detects the period of the FG pulse (i.e., the rotation speed of the disc motor 212). The counter 216 counts up a reference clock from a crystal oscillator (not shown) and cleared by the FG pulse. Immediately before it is cleared, the count of the counter 216 becomes a value corresponding to the period is short (i.e., the rotation speed is fast) and the count is large if the period is long (i.e., the rotation speed is slow).

A register 218 receives a final count of the FG interval counter 216 at each interval of the FG pulse at a timing of the FG pulse. A comparison circuit 220 consists of a full-adder and detects a changing state of the period of the FG pulse. More specifically, the comparison circuit 220 performs an operation of B input−A input in a state in which the output of the FG interval counter 216 (i.e., a value corresponding to the period of the present FG pulse) is applied to its A input, the output of the register 218 (i.e., a value corresponding to the period of immediately preceding FG pulse) is applied to its B input and a signal "0" is applied to its carry input.

If result of the operation is A input<B input, the comparison circuit 220 produces a carry output Co="1" whereas if the result of the operation is A input≧B input, the circuit 220 produces a carry output Co="". When the carry output Co is "1", it represents a state in which the period of the FG pulse has been shortened (i.e., an accelerated state). If this accelerated state exists after a stop command has been issued, it represents a state in which the braking action due to application of a reverse voltage has caused the rotation of the disc motor 212 to accelerate in a reverse direction passing a zero speed point so that this state is judged to be an abnormal state. Conversely, when the carry out Co is "0", it represents a state in which the period of the FG pulse remains unchanged (a constant speed state) or it has been prolonged (a decelerated state). In a stop mode, this state is judged to be a normal state. The timing of detection of the carry out Co of this comparison circuit 220 is only a timing of generation of the FG pulse.

A stop detection circuit 222 judges that the disc motor 212 has substantially been stopped when the count of the FG pulse interval counter 216 has increased to a predetermined value and thereupon produces a stop detection signal STP which is "1".

A high speed detection circuit 224 judges that the disc motor 212 is performing a high speed rotation when the count of the FG pulse interval counter 216 has been reduced to a certain predetermined value and produces a high speed detection signal HSP which is "1".

A disc stop mode control circuit 226 changes the mode of disc stop control and produces a −BRK command or ±BRK command. The −BRK command is a command ordering a mode in which the disc motor 212 is driven in a reverse direction (i.e., a reverse direction to the playback direction). The ±BRK command is a command ordering a mode in which the direction of driving the disc motor 212 is automatically inverted, i.e., from a forward rotation to a reverse rotation or vice versa, in accordance with the acceleration or deceleration state of the disc motor 212. When the disc is to be stopped, the −BRK command is first issued and if a signal "1" is not produced by the stop detection circuit 222 within a predetermined period of time after generation of the −BRK command, this state is deemed to be abnormal and thereupon the mode command is switched to the ±BRK command. In a case where the direction of rotation is not known from the beginning due to an abnormal operation or other reason, the ±BRK command may be issued from the beginning.

A brake output circuit 228 produces signals DM+, DM− and DMSTP as control signals for the disc motor 212. The signal DM+ is a signal driving the disc motor 212 in a forward direction (i.e., the playback direction) and the signal DM− is a signal driving the disc motor 212 in a reverse direction. These signals DM+ and DM− are not simultaneously produced. When a command other than the stop command (e.g., a playback command) has been issued, the brake output circuit 228 performs the rotation control by producing the signal DM+ or DM− in which the pulse width of the signal DM+ or DM− is modulated in accordance with the aimed rotation speed. When the stop command has been issued, the circuit 228 produces the signal DM+ or DM− of a predetermined pulse width as it is.

The signals DM+ and DM− are respectively applied to the disc motor 212 through an addition amplifier 230, a switch 232 and a drive amplifier 234.

The signal DMSTP is a signal used for stopping drive of the disc motor 212 by the signals DM+ and DM−. When the signal DMSTP is turned to "1", a switch 232 is switched off through an inverter 236 thereby interrupting the drive signals DM+ and DM−. The disc motor 212 thereby is naturally decelerated.

The control operation by the brake output circuit 228 is switched by a mode command by the mode control circuit 226. The stopping operation by the brake output circuit 228 will now be described.

When a command other than the stop command (e.g., a playback command) has been issued, the signal DMSTP is "0" and, accordingly, the switch 232 is ON and the drive control (e.g., CAV or CLV) is performed by the pulsewidth modulated signals DM+ and DM− which are obtained by comparing the frequency-divided pulse from the reference clock with the FG pulse.

Upon issuance of the stop command, the drive control is stopped and the mode control circuit 236 issues the −BRK command. The brake output circuit 228 thereby produces the signal DM− which causes a driving force in the reverse direction to be imparted to the disc motor 212 to apply a brake thereto. If a stop detection signal STP has been produced within a predetermined period of time, the signal DMSTP is turned to "1" and the switch 232 thereby is switched off, interrupting the signal DM−. The disc motor 12 thereby is naturally stopped.

If the stop detection signal STP has not been issued within the predetermined period of time from the issuance of the stop command, it is assumed that the disc motor 212 is being rotated reversely passing over the zero speed point and the −BRK command is now replaced by the ±BRK command. The drive signal from the brake output circuit 228 is switched from DM− to DM+ whereby a brake is applied again by reversely rotating the disc motor 212. If the stop detection signal STP is issued by this reverse rotation, the signal DMSTP is turned to "1", the switch 232 is switched off to interrupt the signals DM+ and DM− and the disc motor 212 is naturally stopped. If the stop detection signal STP is not issued despite this reverse rotation, the drive signal is switched again from DM+ to DM− to apply a brake again at a timing at which the carry out Co is produced (i.e., a timing at which the disc rotation has been inverted and entered an accelerated state). Thus, each time the comparison circuit 220 produces the carry out Co (i.e., when the direction of the disc rotation has been inverted passing over the zero speed point), the drive signal is switched between DM+ and DM− to apply a brake and, only when the stop detection signal STP has been issued, the signal DMSTP is turned to "1" thereby causing the switch 232 to be switched off and the disc motor 212 to stop naturally. In this manner, the disc motor 212 can be stopped accurately.

If the stop command is issued in a state in which the disc motor 212 is rotating in a reverse direction at a speed over a predetermined speed due to some reason such as a shock applied from outside (a speed at which the stop detection signal STP cannot be produced), the signal DM− is produced by the −BRK command and, accordingly, the disc motor 212 is accelerated further in the reverse direction and the stop detection signal STP is not obtained at this time. Even in this case, however, the command is switched from the −BRK command to the ±BRK command so that the stop detection signal STP can be finally produced in the course of repeated switching between the signals DM+ and DM− and the disc motor 212 can be accurately stopped.

A specific example of the brake output circuit 228 is shown in FIG. 14. In FIG. 14, a portion relating to the stop control is illustrated and the circuit pulse-width modulating the signals DM+ and DM− is not illustrated.

In FIG. 14, a rise detection circuit 242 detects a rising portion of the −BRK command and thereupon sets a BRK register 240 through an AND gate 258. The output of the BRK register 240 becomes the signal −DM directly through an OR gate 245 and is used for driving the disc motor 212 in a reverse direction. The BRK register 240 is reset through an OR gate 260 when the −BRK command itself is cancelled and falling of the −BRK command has been detected by a fall detection circuit 244 or when the stop detection signal STP="1" has been produced by the stop detection circuit 222 (i.e., the rotation state has been judged to be in a sufficiently low speed state) and a BRSTP register 246 has thereby been set. When the BRSTP register 246 has been set, an AND gate 258 is disabled through an inverter 256 whereby a reset state of the BRK register 240 is maintained.

The BRSTP register 246 is set when the stop detection signal STP has been produced by the stop detection circuit 222. When an OR gate 247 and an AND gate 249 have been switched on by the −BRK command or ±BRK command, the BRSTP register 246 produces the signal DMSTP through an OR gate 251 thereby switching off the disc rotation servo. When the stop detection signal STP has ceased to be produced, the BRSTP register 246 is reset at a timing of the FG pulse.

A BR− register 248 and a BR− register 250 operate in such a manner that either one of them is set when the ±BRK command has been issued and both are reset when the ±BRK command is not issued.

When the BR− register 250 is in a set state and the carry out Co has been produced, AND gates 257 and 259 are switched on at a timing of the FG pulse and the BR+ register 248 is set. At this time, the output of the BR− register 250 is applied to a reset terminal of the BR+ register 248 through an OR gate 263. Since, however, the BR+ register 248 is constructed in such a manner that it operates with a priority being given to a set state, a set state of the BR+ register 248 is obtained. Upon setting of the BR+ register 248, the BR− register 250 is reset through an OR gate 261.

When the BR+ register 248 is in a set state and the carry out Co has been produced, AND gates 257 and 265 are switched on at a timing of the FG pulse and the BR− register 250 thereby is set. The BR− register 250 also operates with a priority being given to a set state. Upon setting of the BR− register 250, the BR+ register 248 is reset through an OR gate 263. Immediately upon issuance of the ± BRK command (the BR+ register 248 and the BR− register 250 are both reset at this time), the rising of the ±BRK command is detected by a rise dtection circuit 252 and the BR− register 250 is set through an AND gate 255 and an OR gate 267.

When falling of the ±BRK command has been detected by a fall detection circuit 254, both the BR+ register 248 and the BR− register 250 are reset through OR gates 263 and 261.

Upon setting of the BR+ register 248, the signal DM+ is produced and upon setting of the BR− register 250, the signal DM− is produced. Since, however, AND gates 264 and 266 are disabled through an inverter 262 in a state in which the BRSTP register 246 is set, the signals DM+ and DM− are not produced regardless of the set state of the BR+ register 248 and the BR− register 250. In other words, the signal DMSTP is given priority.

An AND gate 270 is enabled when the high speed detection circuit 224 has detected a high speed state in a state in which the −BRK command or the ±BRK command is issued and gates out the signal DMSTP through the OR gate 251.

This is a safety measure performing a natural deceleration for avoiding the risk that application of a drive signal to the disc motor from outside, though it may be intended to decelerate the disc rotation, in a high rotation state which means an abnormal state results in even higher rotation of the disc motor if the device should not function as it has been expected to.

A series of operation of the circuit shown in FIG. 14 will now be described.

Upon issuance of the stop command by manipulation of a stop switch or the like, the −BRK command is produced and the BRK register 240 is set at the rising of the −BRK command. The signal DM− thereby is produced and a reverse voltage is applied to the disc motor 212 to apply a brake to the disc motor 212 which has been rotated in a forward direction. This brake is very effective and a substantial deceleration effect is thereby obtained.

If the stop detection signal STP is produced within a predetermined period of time after the issuance of the −BRK command (i.e., the speed has been sufficiently reduced), the BRSTP register 246 is set and the signal DMSTP is produced. At this time, the BRK register 240 is reset by the output of the BRSTP register 246 and the signals DM+ and DM− are not produced because the AND gates 264 and 266 are disabled. Accordingly, the disc rotation servo is switched off and the disc motor 212 is caused to stop naturally. In a normal state, the disc motor 212 can be stopped in this stage.

If the stop detection signal STP has not been produced within the predetermined period of time after the issuance of the −BRK command, the −BRK command is replaced by the ±BRK command. If a high speed detection signal HSP has been produced in this state, the signal DMSTP is produced through the AND gate 270. The disc rotation servo thereby is switched off and the rotation speed of the disc motor 212 decreases naturally. Upon ceasing of production of the high speed detection signal HSP, the signal DMSTP ceases, the disc rotation servo is restored and the signals DM+ and DM− become effective.

Upon issuance of the ±BRK command, the BR− register 250 is set at the rising of the ±BRK command and the signal DM− is produced. The disc motor 212 thereby is driven in a reverse direction. If the stop detection signal STP is produced thereafter, the BRSTP register 246 is set and the signal DMSTP is produced so that the disc rotation servo is switched off and the disc motor 212 is caused to stop naturally.

In this case, however, the stop detection signal STP will rarely be produced in this stage since the disc motor 212 has been decelerated sufficiently in the reverse direction by the preceding −BRK command and, accordingly, the control is actually expected to proceed to a next step. The reason for setting the BR— register 250 first despite such situation is that there can be a situation, such as a case where, as described above, the direction of the disc rotation is not known from the beginning due to existence of an abnormal condition, in which the ±BRK command is directly issued without issuing the —BRK command first and, in such situation, it is more convenient to produce the signal DM— first.

If the stop detection signal STP is not obtained and the direction of rotation has been inverted after passing the zero speed point, an accelerated state is brought about so that the comparison circuit 20 produces the carry out Co. The BR. register 248 therefore is set and the BR— register 250 is reset and the signal DM+ is produced instead of the signal DM—. The driving direction of the disc motor 212 therefore is inverted.

If the accelerated state in the reverse direction exists when the command is switched from the —BRK command to the ±BRK command, the carry out Co is produced from the comparison circuit 220 almost simultaneously with this switching of the command so that the production of the signal DM— finishes almost in an instant to be followed immediately by production of the signal DM+. In most cases, the disc motor 212 can be accurately driven in a decelerating direction and finally stopped in this stage.

If the stop detection signal STP has not been produced yet even in this stage, the signals DM+ and DM— are alternately produced to invert the direction of driving of the disc motor 212 each time the carry out Co representing the accelerated state is produced by the comparison circuit 220 so that the rotation speed is ultimately decelerated and the stop detection signal STP is produced in the course of deceleration. The disc rotation servo is switched off by the signal DMSTP upon production of the singal STP and the disc motor 212 is naturally stopped.

In the above described embodiment, the switching to the ±BRK command is performed on the basis of time elapsed from start of the —BRK command. Alternatively, this switching may be made on the basis of the carry out Co as in the operation by the ±BRK command.

What is claimed is:

1. A disc motor control circuit for a disc playing device, said disc motor control circuit being operable with at least one reference clock, said disc motor control circuit comprising:
   a disc motor for rotating a disc having data recorded thereon, for playing the disc;
   pickup means for detecting data recorded on the disc to produce a reproduced signal from the disc, said reproduced signal including a synchronizing signal;
   a synchronizing signal separating circuit for separating the synchronizing signal from the reproduced signal;
   rotation detection means for detecting the rotation speed of said disc motor and producing a signal corresponding to the detected rotation speed;
   a first control circuit for controlling the rotation speed of said disc motor by comparing the signal corresponding to the detected rotation speed detected by said rotation detection means with one of said at least one reference clock;
   a second control circuit for controlling the rotation speed of said disc motor by comparing the synchronizing signal separated from the reproduced signal with one of said at least one reference clock;
   a window circuit for determining a time window in which a next synchronizing signal is expected to occur, on the basis of the synchronizing signal separated from the reproduced signal;
   detection means for detecting a state of rotation of said disc motor by counting the number of times the synchronizing signal occurs in said window; and
   mode switching means responsive to the number counted by said detection means for selectively operating one of said first control circuit and said second control circuit.

2. A disc motor control circuit as defined in claim 1 further comprising window width changing means for changing the width of said window determined by said window circuit in such a manner that a wide window is used when the control by said first control circuit is performed and a narrow window is used when the control by said second control circuit is performed and, when the result of counting by said detection means has reached a predetermined count in using said narrow window, a window of a slightly larger width than said narrow window is used, the control by said first control circuit being selected when the result of counting by said detection means is below a predetermined count, the control being switched to that by said second control circuit when the result of counting by using the wide window has reached a predetermined count and various controls being effected when the result of counting by using said narrow window becomes above a predetermined count and being ceased when the result of counting by using said window of a slightly larger width than said narrow window is below a predetermined count.

3. A disc motor control circuit as defined in claim 2 wherein said disc is a video disc and said synchronizing signal comprises a horizontal synchronizing signal.

4. A disc motor control circuit for a disc playing device, said disc motor control circuit being operable with at least one reference clock, said disc motor control circuit comprising:
   a disc motor for rotating a disc having data recorded thereon for playing of the disc;
   pickup means for detecting data recorded on the disc to produce a reproduced signal from the disc;
   a synchronizing signal separating circuit for separating a synchronizing signal from the reproduced signal from the disc;
   rotation detection means for detecting the rotation speed of said disc motor and producing a signal corresponding to the detecting rotation speed;
   a first control circuit for controlling the rotation speed of said disc motor by comparing the signal corresponding to the detected rotation speed from said rotation detection means with one of said at least one reference clock;
   a second control circuit for controlling the rotation speed of said disc motor by comparing the synchronizing signal separated from the reproduced signal with one of said at least one reference clock;
   limit setting means for setting upper and lower limit values of the disc rotation speed;
   comparison means for comparing the upper and lower limit values set by said limit setting means with the signal corresponding to the detect ed rotation speed from said rotation detection means for detecting a rotation state; and mode switching means responsive to said comparison means for selectively operating one of said first control circuit and said second control circuit.

5. A disc motor control circuit as defined in claim 4 wherein said mode switching means operates in such a manner that acceleration and deceleration of the disc motor are repeated during the control by said first control circuit so that the rotation speed is decreased upon reaching the upper limit value as a result of acceleration and increased upon reaching the lower limit value as a result of deceleration and, if a condition suitable for the control by said second control circuit has occurred in the course of this repeated acceleration and deceleration, the control of the rotation speed is switched to said second control circuit.

6. A disc motor control circuit as defined in claim 5 wherein said disc is a video disc and said synchronizing signal comprises a horizontal synchronizing signal.

7. A disc motor control circuit in a disc playing device, said disc motor control circuit comprising:

a disc motor for rotating a disc having data recorded thereon for playing the disc;

pickup means for detecting data recorded on the disc to produce a reproduced signal from the disc;

drive means for driving said disc motor;

rotation speed detection means for detecting the rotation speed of said disc motor comprising a first detection means for detecting a state in which the rotation speed is substantially zero which the rotation speed is increased; and brake means responsive to the detection results of said first detection means and said acceleration detection means for controlling braking of said disc motor.

8. A disc motor control device as defined n claim 7 wherein said brake means has a first mode in which a voltage for driving said disc motor in a reverse direction is applied to said disc motor when a stop command has been issued and application of voltage to said disc motor is stopped when the state in which the rotation speed is substantially zero has been detected by said first detection means and a second mode in which the direction of rotation of said disc motor is reversed when the accelerated state of the disc motor has been detected by said acceleration detection means in a state in which said stop command has been issued and application of voltage to said disc motor is stopped when the state in which the rotation speed is substantially zero has been detected by said first detection means.

9. A disc rotation controlling circuit for a disc playing device, said disc rotation controlling circuit comprising:

a disc motor for rotating a disc having data recorded thereon;

pickup means for detecting data recorded on the disc and for providing a first signal corresponding to the detected data, wherein said first signal includes a synchronizing signal;

a synchronizing signal separating circuit for separating the synchronizing signal from the first signal;

rotation detection means for detecting the rotation speed of said disc motor and for providing a second signal corresponding to the detected rotation speed;

first control means responsive to the second signal for controlling the rotation speed of said disc motor;

second control means responsive to the synchronizing signal for controlling the rotation speed of said disc motor;

determining means for determining a time window in which the synchronizing signal is expected to occur;

counting means for counting the number of times the synchronizing signal occurs in the time window; and mode switching means responsive to the number counted by said first control means and said second control means.

10. A disc rotation controlling circuit as claimed in claim 9, further comprising:

third control means for controlling the width of the time window and for providing a first time window width when said first control means is operated and a second time window width when said second control means is operated, wherein said first time window width is wider than said second time window width.

11. A disc rotation controlling circuit as claimed in claim 10, wherein said third control means comprises:

fourth control means, responsive to the number counted by said counting means reaching a predetermined number when the width of the time window is controlled at the second time window width, for providing a time window width which is slightly wider than the second time window width.

12. A disc rotation controlling circuit as claimed in claim 11, wherein the rotation speed of said disc motor is controlled by said first control means when the number counted by said counting means is below a predetermined number and the rotation speed of said disc motor is controlled by said second control means when the number counted by said counting means reaches a predetermined number.

13. A disc rotation controlling circuit as claimed in claim 12, wherein said disc is a video disc and said synchronizing signal comprises a horizontal synchronizing signal.

* * * * *